United States Patent [19]

Ogata et al.

[11] 3,947,395

[45] Mar. 30, 1976

[54] EPOXY SURFACE COATING COMPOSITIONS

[75] Inventors: Masatsugu Ogata; Mikio Sato, both of Hitachi, Japan

[73] Assignees: Hitachi, Ltd.; Hitachi Chemical Company, Ltd., both of Japan

[22] Filed: May 7, 1974

[21] Appl. No.: 467,794

[52] U.S. Cl............. 260/28 P; 260/47 EC; 427/138
[51] Int. Cl.²................................................ C08J 3/20
[58] Field of Search ........... 260/28, 47 EC; 427/138

[56] References Cited
UNITED STATES PATENTS

| | | |
|---|---|---|
| 3,012,486 | 12/1961 | Newey ................................ 427/138 |
| 3,033,088 | 5/1962 | Wittenwyler ........................ 427/138 |
| 3,105,771 | 10/1963 | Simpson et al. ..................... 427/138 |
| 3,161,114 | 12/1964 | Wittenwyler ........................ 427/138 |
| 3,417,678 | 12/1968 | Ewers .................................. 427/138 |
| 3,637,572 | 1/1972 | Ogata et al. ..................... 260/47 EC |
| 3,755,226 | 8/1973 | Christiansen et al. ................ 260/28 |
| 3,811,911 | 5/1974 | Doi ..................................... 427/138 |

*Primary Examiner*—V. P. Hoke
*Attorney, Agent, or Firm*—Craig & Antonelli

[57] ABSTRACT

Surface coating compositions consisting essentially of (a) at least one of coal tar and asphalt, (b) an epoxy resin and (c) at least one of tetrasubstituted boron salts of onium ions and tetrasubstituted boron salts of imidazolium ions, which are suitable for coating the surface of concrete, asphalt, metals or the like.

12 Claims, No Drawings

EPOXY SURFACE COATING COMPOSITIONS

BACKGROUND OF THE INVENTION

The present invention relates to surface coating compositions. More particularly, the invention pertains to surface coating compositions suitable for coating the surface of concrete, asphalt, metals or the like, which consist essentially of (a) at least one of coal tar and asphalt, (b) an epoxy resin and (c) at least one of tetrasubstituted boron salts of onium ions and tetrasubstituted boron salts of imidazolium ions.

The damage of a paved street has recently become severer with a marked increase in the volume of auto traffic. For example, the appearance of holes or cracks of various sizes, the smoothening of skidproof road surface, the exposure of the surface of metals used in a bridge, etc., the melt flow of an asphalt-paved road owing to high temperature in summer, etc. occur. Various compositions consisting of coal tar and asphalt and an epoxy resin have heretofore been used in order to reduce the abrasion of a paved road and the damages caused by rain, heat, the spreading of anti-freezing salts, etc. However, the properties of prior art compositions have not been sufficient to reduce the above-mentioned damages of a road, and their improvement has been required.

SUMMARY OF THE INVENTION

An object of the present invention is to provide a one-can type surface coating composition having excellent adhesive property which is effective for improving the adhesive property of a new concrete surface to an old concrete surface, repairing a surface, repairing a damaged road containing crevices, cracks, holes, etc. or skidproofing the surface of a road. Another object of the invention is to provide a surface coating composition for paving a road which requires toughness for, particularly, heat, abrasion, chemicals, etc. The other objects of the invention will appear from the following description of the invention.

The coating compositions according to the present invention are characterized by consisting essentially of (a) 100 parts by weight of at least one resinous substance selected from coal tar and asphalt, (b) 10 – 200 parts by weight of an epoxy resin having at least two vicinal epoxy groups in its molecule and (c) 0.01 – 60 parts by weight of at least one salt compound selected from the group consisting of tetrasubstituted boron salts of onium ions represented by the formula,

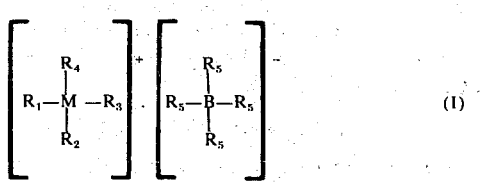

wherein M is N, P or As, $R_1$, $R_2$, $R_3$ and $R_4$ each are hydrogen, an alkyl, an alkenyl or an aryl and may be the same or different, and $R_5$ is phenyl or a substituted phenyl, and from the group consisting of tetrasubstituted boron salts of imidazolium ions obtained by reacting an acid with an imidazole represented by the formula,

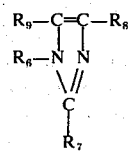

wherein $R_6$, $R_7$, and $R_8$ and $R_9$ each are hydrogen, an alkyl, an alkenyl, an aryl or a cyano-alkyl and may be the same or different, or a derivative thereof to form an imidazolium salt and then reacting the resulting salt with a tetrasubstituted boron alkali metal salt.

The greatest characteristic of the present invention resides in that the above-mentioned tetrasubstituted boron salts of onium ions and tetrasubstituted boron salts of imidazolium ions are used as one of the essential components of the desired compositions. The tetrasubstituted boron salts of onium ions and tetrasubstituted boron salts of imidazolium ions are exemplified by tetrabutylphosphonium tetraphenylborate, n-butyltriphenylphosphonium tetraphenylborate, tetraphenylphosphonium tetraphenylborate, trimethylphenylphosphonium tetraphenylborate, diethylmethylphenylphosphonium tetraphenylborate, diallylmethylphenylphosphonium tetraphenylborate, (2-hydroxyl-ethyl)triphenylphosphonium tetraphenylborate, ethyltriphenylphosphonium tetraphenylborate, p-xylenebis (triphenylphosphonium tetraphenylborate), tetraphenylphosphonium tetraethylborate, tetraphenylphosphonium triethylphenylborate, tetraphenylphosphonium tetrabutylborate, triethylammonium tetraphenylborate, trimethylammonium tetraphenylborate, triphenylammonium tetraphenylborate, diethylmethylammonium tetraphenylborate, diphenylmethylammonium tetraphenylborate, tetramethylarsonium tetraphenylborate, tetraphenylarsonium tetraphenylborate, dimethyldiethylarsonium tetraphenylborate, triethyl-n-octylarsonium tetraphenylborate, imidazolium tetraphenylborate, methylimidazolium tetraphenylborate, 2-ethyl-4-methylimidazolium tetraphenylborate, 2-ethyl-1,4-dimethylimidazolium tetraphenylborate, 1-cyanoethyl-2-ethyl-4-methylimidazolium tetraphenylborate, 1-cyanoethyl-2-undecylimidazolium tetraphenylborate, 1-cyanoethyl-2-phenylimidazolium tetraphenylborate, 1-vinyl-2-methylimidazolium tetraphenylborate, 1-vinyl-2,4-dimethylimidazolium tetraphenylborate, 1-β-hydroxyethyl-2-methylimidazolium tetraphenylborate, 1-allyl-2-methylimidazolium tetraphenylborate, 1-allyl-2-phenylimidazolium tetraphenylborate, 1-allyl-2-undecylimidazolium tetraphenylborate, etc. At least one of them is used in the present invention. The following Preparation Examples illustrate the preparation of some of these compounds.

PREPARATION EXAMPLE 1

15.7 Grams (0.04 mole) of tetraphenylphosphonium chloride was dissolved in 300 ml of distilled water warmed to 50°C, and 200 ml of an aqueous solution of 14.5 g (0.042 mole) of Dotite Kalibor (a trademark for a sodium tetraphenylborate manufactured by Dojin Yakukagaku Kenkyusho in Japan) was slowly added thereto with stirring to effect the reaction of the mixture. Thus, 25 g of tetraphenylphosphonium tetraphenylborate was obtained as a white precipitate. The product showed a melting point of 309° – 311°C.

PREPARATION EXAMPLE 2

15 Grams (0.149 mole) of triethylamine and 13 ml of concentrated hydrochloric acid were dissolved in 1.4 l of distilled water and 400 ml of an aqueous solution of 50 g (0.146 mole) of the same Dotite Kalibor as used in Preparation Example 1 was slowly added thereto with stirring to effect the reaction of the mixture. Thus, 60.5 g of triethylammonium tetraphenylborate was obtained as a white precipitate. The product showed a melting point of 195° – 200°C.

PREPARATION EXAMPLE 3

5.0 Grams (0.012 mole) of tetraphenylarsonium chloride was dissolved in 300 ml of distilled water at 50°C and 200 ml of an aqueous solution of 4.1 g (0.012 mole) of the same Dotite Kalibor as used in Preparation Example 1 was slowly added thereto with stirring to effect the reaction of the mixture. Thus, 8.0 g of tetraphenylarsonium tetraphenylborate was obtained as a white precipitate. The product showed a melting point of 293° – 294°C.

Tetrasubstituted boron salts of imidazolium ions can be produced by the following process:

First of all, for example, imidazole, 2-methylimidazole, 2-undecylimidazole, 2-heptadecylimidazole, 2-phenylimidazole, 2-ethyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole or 1-cyanoethyl-2-phenylimidazole is reacted with at least one selected from inorganic acids such as hydrochloric acid, sulfuric acid, nitric acid, etc., organic acids such as acetic acid, oxalic acid, succinic acid, etc., said aromatic nitro compounds such as picric acid and picrolonic acid, and halogenated alkyls in water or an organic solvent such as an alcohol, etc. at room temperature or an elevated temperature to form an imidazolium salt represented by the formula,

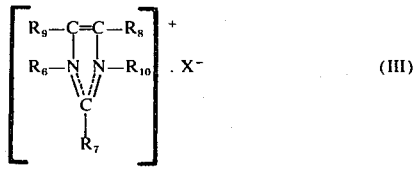

(III)

wherein $R_6$, $R_7$, $R_8$ and $R_9$ are as defined above, $R_{10}$ is hydrogen, an alkyl, an alkenyl or an aryl and $X^-$ is an anion such as chloride, bromide, iodide, sulfate, nitrate or acetate ion. The resulting imidazolium salt is then reacted with a tetrasubstituted boron alkali metal salt represented by the formula,

(IV)

wherein $R_{11}$ is phenyl or a substituted phenyl and Me is lithium, potassium or sodium, in water or an organic solvent at room temperature or an elevated temperature. The tetrasubstituted boron salts of imidazolium ions are represented by the formula,

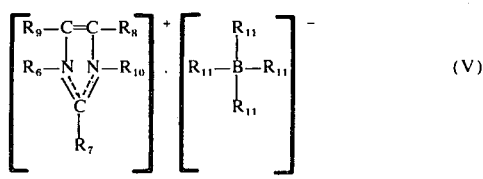

(V)

wherein $R_6$, $R_7$, $R_8$, $R_9$, $R_{10}$ and $R_{11}$ are as defined. The general formulas (III) and (V) are not decisive but presumptive. The following Preparation Examples illustrate the preparation of the tetrasubstituted boron salts of imidazolium ions.

PREPARATION EXAMPLE 4

A solution of 0.85 g of imidazole in 300 cc of water was reacted with 1.2 cc of concentrated hydrochloric acid. The resulting compound of the formula (III) was then reacted with 50 cc of an aqueous solution of 4.3 of sodium tetraphenylborate with stirring to obtain 4.5 g of imidazolium tetraphenylborate as a white precipitate having a melting point of 185° – 188°C.

PREPARATION EXAMPLE 5

A solution of 1.6 g of 2-ethyl-4-methylimidazole in 300 cc of water was reacted with 1.2 cc of concentrated hydrochloric acid. The resulting compound of the formula (III) was then reacted with 50 cc of an aqueous solution of 4.3 g of sodium tetraphenylborate with stirring to obtain 5.5 g of 2-ethyl-4-methylimidazolium tetraphenylborate as a white precipitate having a melting point of 186° – 190°C.

PREPARATION EXAMPLE 6

A solution of 2.6 g of 1-cyanoethyl-2-phenylimidazole in 300 cc of methyl alcohol was reacted with 1.2 cc of concentrated hydrochloric acid. The resulting compound of the formula (III) was then reacted with 50 cc of an aqueous solution of 4.3 g of sodium tetraphenylborate with stirring to obtain 6.0 g of 1-cyanoethyl-2-phenylimidazolium.tetraphenylborate as a white precipitate having a melting point of 105° – 110°C.

Preparation Example 7

A solution of 2.4 g of 1-cyanoethyl-2-undecylimidazole in 300 cc of methyl alcohol was reacted with 0.8 cc of concentrated hydrochloric acid. The resulting compound of the formula (III) was then reacted with 50 cc of an aqueous solution of 2.9 g of sodium tetraphenylborate with stirring to obtain 5.0 g of 1-cyanoethyl-2-undecylimidazolium.tetraphenylborate as a white precipitate having a melting point of 95° – 98°C.

PREPARATION EXAMPLE 8

A solution of 2.2 g of 1-cyanoethyl-2-ethyl-4-methylimidazole in 300 cc of methyl alcohol was reacted with 1.2 cc of concentrated hydrochloric acid. The resulting compound of the formula (III) was then reacted with 50 cc of an aqueous solution of 4.3 g of sodium tetraphenylborate with stirring to obtain 6.0 g of 1-cyanoethyl-2-ethyl-4-methylimidazolium.tetraphenylborate as a white precipitate having a melting point of 160° – 162°C.

PREPARATION EXAMPLE 9

To a solution of 1.2 g of 2-ethyl-4-methylimidazole in 100 cc of methyl alcohol was added 1.5 g of methyl iodide and the mixture was refluxed for about 3 hours. After the completion of the reaction, excess methyl iodide and methyl alcohol were removed by evaporation. The resulting compound of the formula (III) was again dissolved in 300 cc of methyl alcohol. The solution was reacted with 50 cc of an aqueous solution of 3.4 g of sodium tetraphenylborate with stirring to obtain 4.5 g of 2-ethyl-1,4-dimethylimidazolium.tetraphenylborate as a white precipitate having a melting point of 233° – 236°C.

The resinous substance (a) consisting of coal tar and/or asphalt used in the present invention is a residue obtained by dry distillation, distillation or thermal decomposition of coal or petroleum and consists of a mixture of various compounds. In view of its water resistance, chemical resistance, thermal resistance and other properties after curing, one having a high aromatic component content and a high boiling point is desirable. On the one hand, it is advisable to contain lower boiling components to a certain degree in order to improve compatibility with the epoxy resin (b) as described below.

The epoxy resin (b) means the whole epoxy resin already known. For example, it is exemplified by a bisphenol epoxy resin obtained from bisphenol A and epichlorohydrin, a novolac epoxy resin obtained by reacting a novolac resin with epichlorohydrin, a polyphenol epoxy resin obtained by reacting epichlorohydrin with a condensation product of a phenol with a xylene resin or toluene resin obtained by reacting xylene with formalin or reacting toluene with paraformaldehyde, a polyhydroxybenzene epoxy resin obtained by reacting epichlorohydrin with a phenol resin produced from a polyhydric phenol such as resol or hydroquinone, an epoxy resin obtained by reacting an aromatic or aliphatic carboxylic acid with epichlorohydrin, an epoxy resin obtained from a vinyl polymer, an epoxy resin obtained from a polyhydric alcohol such as glycerol, an epoxy resin obtained from an alicyclic compound such as cyclohexene, cyclopentadiene or dicyclopentadiene, an epoxy resin obtained from a natural substance such as starch or an unsaturated higher fatty acid, a nitrogen-containing epoxy resin obtained from aniline or an aliphatic amine, an epoxy resin having a nitrogen-containing hetero-cyclic ring obtained from isocyanuric acid, a silicon-containing epoxy resin obtained by reacting an epoxy resin with silanol, a silicon-containing epoxy resin obtained by oxidizing a silicon compound having a carbon-carbon double bond, epoxyphosphorous acid obtained by epoxidizing a phosphorous acid ester having an olefinic unsaturation with peracetic acid, and an epoxy resin containing a heavy metal other than silicon and phosphorous in the form of a chelate. At least one of these epoxy resins is used.

The reason why an amount of the epoxy resin (b) blended in the present invention has been specified to be 10 – 200 parts by weight per 100 parts by weight of the resinous substance (a) is to improve the working property of the desired composition and the adhesive property, chemical resistance, thermal resistance or abrasion resistance of the cured composition satisfactorily. Also, the reason why an amount of the tetrasubstituted boron salt of an onium ion and/or tetrasubstituted boron salt of an imidazolium ion (c) blended has been specified to be 0.01 – 60 parts by weight is to improve the heat-curability of the desired composition and the properties of the cured composition satisfactorily. The above-mentioned tetrasubstituted boron salts have latent curing activity for the above-mentioned epoxy resin (b), and cure the desired coating composition to yield a curing product having preferable properties. The properties of the curing product can be further improved by the use of a polycarboxylic anhydride curing agent or an amine compound curing agent. As the polycarboxylic anhydride curing agent, for example, at least one of maleic anhydride, dichloromaleic anhydride, dodecenylsuccinic anhydride, pyromellitic anhydride, trimellitic anhydride, phthalic anhydride, tetrahydrophthalic anhydride, methyltetrahydrophthalic anhydride, methylhexahydrophthalic anhydride, hexahydrophthalic anhydride, endomethylenetetrahydrophthalic anhydride, methylendomethylenetetrahydrophthalic anhydride, hexachloroendomethylenetetrahydrophthalic anhydride, etc. is used. Also, as the amine compound curing agent, for example, at least one of aliphatic polyamines such as polymethylenediamine, polyetherdiamine, iminobispropylamine, bis(-hexamethylene) triamine, tetraethylenepentamine and dimethylaminopropylamine, alicyclic polyamines such as menthanediamine, N-aminoethylpiperazine and 1,3-diaminocyclohexane, aromatic ring-containing amines such as tetrachloro-p-xylenediamine, aromatic amines such as m-phenylenediamine, diaminodiphenylether, diaminodiphenylmethane, diaminodiphenylsulfon, benzidine, 4,4'-bis(o-toluidine), 4,4'-thiodianiline, dianisidine, methylenebis (o-chloroaniline), bis(3,4-diaminophenyl) sulfone and diaminoditolylsulfone, and dicyandiamide, etc. is used. An amount of these polycarboxylic anhydride curing agents or amine compound curing agents used may be the same as in the preparation of ordinary epoxy resin-polycarboxylic anhydride compositions or epoxy resin-amine compound compositions. Thus, it is preferable that an equivalent ratio of epoxy to polycarboxylic anhydride or amine is 1 : 0.1 to 1.5. If the polycarboxylic anhydrides or amine compounds are used, an amount of the tetrasubstituted boron salts of an onium ion or an imidazolium ion (c) used may be smaller than the above-mentioned amount used. Thus, the use of 0.1 to 10 parts by weight per 100 parts by weight of the epoxy resin is sufficient. Also, as a curing catalyst for accelerating further curing reaction, at least one of, for example, boron trifluoride complex of diphenylamine, aniline, o-toluidine, p-toluidine, 2,4-dimethylaniline, N-methylaniline, N-ethylaniline, N,N-diethylaniline, n-butylamine, ethylamine, N,N-dimethylaniline or piperidine, imidazole or derivatives thereof, various amines such as dimethylaminopropylamine, diethylaminopropylamine, triethylamine, diethylamine, benzyldimethylamine, 2-(dimethylaminomethyl)phenol, 2,4,6-tris(dimethylaminomethyl)phenol, diisoprophylamine, triethanolamine, diethanolamine, methylethanolamine, piperidine, pyridine, aniline, monoethanolamine, nonylamine, N-aminopropylmorpholine and monoisopropanolamine, phenols such as phenol, bisphenol A, resorcinol and nonylphenol, organic metal compounds, etc. can be used in the present invention. The more the amount of these curing catalysts used is, the more the curing reaction of the desired coating composition is accelerated. However, the shelf life of the composition is remarkably reduced at the same time. Therefore, the amount used should be restricted. Thus, these curing catalysts are desirably used in an amount of 1 – 30 % based on the weight of the tetrasubstituted boron salt of an onium ion or an imidazolium ion (c) used in the objective composition. It is possible by the use of such an amount of the curing catalyst to accelerate the curing reaction remarkably substantially without reducing the shelf life of the objective composition when the composition is heated.

If necessary, a flexibilizer such as polyethylene glycol, polypropylene glycol, a dimer acid, dodecenylsuccinic anhydride, a polyamide resin, a polysulfide resin, an urethane elastomer, etc. or a diluent such as an olefin oxide, glycidyl methacrylate, cyclohexenevinylmonooxide, styrene oxide, phenylglycidyl ether, butadiene oxide, diglycidyl ether, bis (2,3-epoxy-cyclopentyl)ether, divinylbenzenedioxide, etc. can be added. Also, sand, crushed rock and the other inorganic compounds or pulverized various plastic wastes, etc. can be added to the composition to make the cured product skidproof. These additives may be incorporated into the objective coating composition as described above. Alternatively, the additives may be scattered on the surface coated with the composition before the composition is cured.

It is desirable to effect curing in a short period of time and carry out heating at about 100° – 150°C for a short period of time to improve the properties of the curing product when the coating compositions of the present invention are applied to the surface of concrete or a metal or to the crevices, cracks, holes, etc. of a road and are then cured. Coating may be carried out by any suitable method. As a heating method, it is simplest to use a gas burner or an infrared ray lamp, but the heating means are not limited to them. Any heating means may be used.

The following examples illustrate the present invention in more detail.

EXAMPLE 1

100 Parts by weight of commercial purified coal tar (Tarcron No. 180 manufactured by Yoshida Seiyusho in Japan), 75 parts by weight of an epoxy resin consisting essentially of diglycidyl ether of bisphenol A (Epikote 828 manufactured by Shell Chemical Co., epoxy equivalent 175 – 210), 50 parts by weight of an epoxy resin consisting essentially of vinylcyclohexenediepoxide (ERL-4206 manufactured by Union Carbide Corp., epoxy equivalent 74 - 78), 10 parts by weight of 2-ethyl-4-methylimidazolium.tetraphenylborate and 0.5 part by weight of triethylenetetramine were mixed to obtain a desired surface coating composition. This composition was applied onto the surface of a concrete road in a thickness of about 2 mm by brush coating. Further, 20 – 50 mesh rock particles were scattered thereon to such a degree as the surface coating layer was completely covered with the rock particles. The coated surface was then heated by a burner to cure the coating film and excess rock particles were swept off. Thus, a rough surface consisting of rock particles was obtained.

The thus obtained coating was compared with prior art asphalt pavement with regard to abrasion resistance in a private slope path. As a result, it was found that the coating composition of the present example was superior to the prior art asphalt pavement in abrasion resistance and showed satisfactory skidproofing effect. Further, the coating composition of this example had satisfactory thermal resistance in that it showed no melt flowing phenomenon even if heated. Also, the coating composition of this example had very good storage stability in that it retained flowability enough to be applied onto the surface of a road even after allowing to stand at about 30°C for 3 months.

EXAMPLE 2

Three objective coating compositions were produced by adding (1) 2 parts by weight of 1-cyanoethyl-2-phenylimidazolium.tetraphenylborate, (2) 2 parts by weight of tetraphenylphosphonium.tetraphenylborate, and (3) tetraphenylarsonium.tetraphenylborate, respectively, to a composition consisting of 100 parts by weight of Tarcron No. 180, 100 parts by weight of Epikote 828, 80 parts by weight of methyltetrahydrophthalic anhydride and 0.2 part by weight of 2,4,6-trisdimethylamino)phenol. A hole of about 500 mm in diameter and 100 mm in depth occurred in an asphalt paved road was repaired with these respective coating compositions. First of all, sand and dust in the hole were removed. The fresh sand was then spreaded all over the hole to the same level as that of the road surface. The above-mentioned coating compositions were scattered thereon, heated by a burner and cured. In case of all the coating compositions, the repaired part of the road endured the volume of traffic afterward sufficiently. Thus, the coating compositions were found to be satisfactorily usable as a road repairing material.

EXAMPLE 3

Two objective coating compositions were produced by adding (1) 3 parts by weight of imidazolium.tetraphenylborate and (2) 3 parts by weight of triethylammonium.tetraphenylborate, respectively, to a composition consisting of 100 parts by weight of Tarcron No. 180, 100 parts by weight of an epoxy resin consisting essentially of diglycidyl ester of tetrahydrophthalic acid (CY-182 manufactured by Shell Chemical Co., epoxy equivalent 150 – 170), 50 parts by weight of diaminodiphenylsulfon and 0.5 part by weight of boron trifluride monoethylamine complex compound. These compositions were applied onto a steel-aluminum panel and a concrete panel in a thickness of about 2 mm and then heated by a burner to cure them. In order to test the solvent resistance and weather proofness of these coatings, the coated panels were allowed to stand outdoors for three months while 100 ml/m$^2$ of a jet fuel was sprayed onto the panels once a day. Four kinds of test pieces obtained by applying the above-mentioned coating compositions onto the metal panel and the concrete panel were not damaged at all, and were found to have excellent chemical resistance and weathering proofness. Also, these respective compositions were confirmed to be usable in the same uses as in Examples 1 and 2.

What is claimed is:

1. A surface coating composition consisting essentially of (a) 100 parts by weight of at least one resinous substance selected from the group consisting of coal tar and asphalt, (b) 10 – 200 parts by weight of an epoxy resin having at least two vicinal epoxy groups in its molecule and (c) 0.01 – 60 parts by weight of at least one salt compound selected from the group consisting of a tetrasubstituted boron salt of an onium ion represented by the formula:

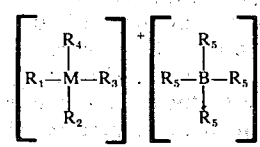

wherein M is N, P or As, $R_1$, $R_2$, $R_3$ and $R_4$ each are hydrogen, an alkyl, an alkenyl, or an aryl and may be the same or different, and $R_5$ is phenyl or a substituted phenyl, and a tetrasubstituted boron salt of an imidazolium ion obtained by reacting an acid with an imidazole represented by the formula:

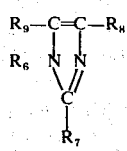

wherein $R_6$, $R_7$, $R_8$ and $R_9$ each are hydrogen, an alkyl, an alkenyl, an aryl or a cyanoalkyl and may be the same or different, or a derivative thereof to form an imidazolium salt and then reacting the resulting imidazonium salt with a salt of an alkali metal and tetrasubstituted boron having phenyl or a substituted phenyl as a substituent.

2. A surface coating composition according to claim 1, wherein the salt compound (c) is at least one of tetrabutylphosphonium.tetraphenylborate, n-butyltriphenylphosphonium.tetraphenylborate, tetraphenylphosphonium.tetraphenylborate, trimethylphenylphosphonium.tetraphenylborate, diethylmethylphenylphosphonium.tetraphenylborate, diallymethylphenylphosphonium.tetraphenylborate, (2-hydroxylethyl)triphenylphosphonium.tetraphenylborate, ethyltriphenylphosphosphonium.tetraphenylborate, p-xylenebis(triphenylphosphonium.tetraphenylborate), tetraphenylphosphonium.tetraethylborate, tetraphenylphosphonium.triethylphenylborate, tetraphenylphosphonium.tetrabutylborate, triethylammonium.tetraphenylborate, trimethylammonium.tetraphenylborate, triphenylammonium.tetraphenylborate, diethylmethylammonium.tetraphenylborate, diphenylmethylammonium.tetrapnehylborate, tetramethylarsonium.tetraphenylborate, tetraphenylarsonium.tetraphenylborate, dimethyldiethylarsonium.tetraphenylborate, or triethyl-n-octylarsonium.tetraphenylborate.

3. A surface coating composition according to claim 1, wherein the salt compound (c) is at least one of imidazolium.tetraphenylborate, methylimidazolium.tetraphenylborate, 2-ethyl-4-methylimidazolium.tetraphenylborate, 2-ethyl-1,4-dimethyl-imidazolium.tetraphenylborate, 1-cyanoethyl-2-ethyl-4-methylimidazolium.tetraphenylborate, 1-cyanoethyl-2-ethyl-4-methylimidazolium.tetraphenylborate, 1-cyanoethyl-2-undecylimidazolium.tetraphenylborate, 1-cyanoethyl-2-phenylimidazolium.tetraphenylborate, 1-vinyl-2-methylimidazolium.tetraphenylborate, 1-vinyl-2,2-dimethylimidazolium.tetraphenylborate, 1-β-hydroxyethyl-2-methylimidazolium.tetraphenylborate, 1-allyl-2-methylimidazolium.tetraphenylborate, 1-allyl-2-phenylimidazolium.tetraphenylborate or 1-allyl-2-undecylimidazolium.tetraphenylborate.

4. A surface coating composition according to claim 1, wherein the epoxy resin is at least one epoxy resin selected from the group consisting of a bisphenol epoxy resin obtained from bisphenol A and epichlorohydrin; a novolac epoxy resin obtained by reacting a novolac resin with epichlorohydrin; a polyphenol epoxy resin obtained by reacting epichlorohydrin with a condensation product of a phenol with a xylene resin or toluene resin obtained by reacting xylene with formalin or reacting toluene with paraformaldehyde; a polyhydroxybenzene epoxy resin obtained by reacting epichlorohydrin with a phenol resin produced from a polyhydric phenol; an epoxy resin obtained by reacting an aromatic or aliphatic carboxylic acid with epichlorohydrin; an epoxy resin obtained from a vinyl polymer; an epoxy resin obtained from a polyhydric alcohol; an epoxy resin obtained from an alicyclic compound; an epoxy resin obtained from starch or an unsaturated higher fatty acid; a nitrogen-containing epoxy resin obtained from aniline or an aliphatic amine; an epoxy resin having a nitrogen-containing hetero-cyclic ring obtained from isocyanuric acid; a silicon-containing epoxy resin obtained by reacting an epoxy resin with silanol; a silicon-containing epoxy resin obtained by oxidizing a silicon compound having a carbon-carbon double bond; epoxyphosphorous acid obtained by epoxidizing a phosphorous acid ester having an olefinic unsaturated with peracetic acid; and an epoxy resin containing a heavy metal other than silicon and phosphorous in the form of a chelate.

5. A surface coating composition consisting essentially of (a) 100 parts by weight of at least one resinous substance selected from the group consisting of coal tar and asphalt, (b) 10 – 200 parts by weight of an epoxy resin having at least two vicinal epoxy groups in its molecule, (c) 0.01 – 60 parts by weight of at least one salt compound selected from the group consisting of a tetrasubstituted boron salt of an onium ion represented by the formula,

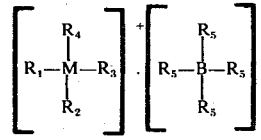

wherein M is N, P or As, $R_1$, $R_2$, $R_3$ and $R_4$ each are hydrogen, an alkyl, an alkenyl, or an aryl and may be the same or different, and $R_5$ is phenyl or a substituted phenyl, and a tetrasubstituted boron salt of an imidazolium ion obtained by reacting an acid with an imidazole represented by the formula;

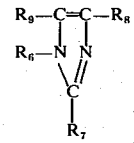

wherein $R_6$, $R_7$, $R_8$ and $R_9$ each are hydrogen, an alkyl, an alkenyl, an aryl or a cyanoalkyl and may be the same or different, or a derivative thereof to form an imidazolium salt and then reacting the resulting salt with a salt of an alkali metal and a tetrasubstituted boron having phenyl or a substituted phenyl as a substituent, and (d) 5 – 150 parts by weight of at least one curing agent selected from the group consisting of polycarboxylic anhydrides and amine compounds.

6. A surface coating composition according to claim 5, wherein the epoxy resin is at least one epoxy resin selected from the group consisting of a bisphenol epoxy resin obtained from bisphenol A and epichlorohydrin; a novolac epoxy resin obtained by reacting a novolac resin with epichlorohydrin; a polyphenol epoxy resin obtained by reacting epichlorohydrin with a condensation product of a phenol with a xylene resin or toluene resin obtained by reacting xylene with formalin or reacting toluene with paraformaldehyde; a polyhydroxybenzene epoxy resin obtained by reacting epichlorohydrin with a phenol resin produced from a polyhydric phenol; an epoxy resin obtained by reacting an aromatic or aliphatic carboxylic acid with epichlorohydrin; an epoxy resin obtained from a vinyl polymer; an epoxy resin obtained from a polyhydric alcohol; an epoxy resin obtained from an alicyclic compound; an epoxy resin obtained from starch or an unsaturated higher fatty acid; a nitrogen-containing epoxy resin obtained form aniline or an aliphatic amine; an epoxy resin having a nitrogen-containing hetero-cyclic ring obtained from isocyanuric acid; a silicon-containing epoxy resin obtained by reacting an epoxy resin with silanol; a silicon-containing epoxy resin obtained by oxidizing a silicon compound having a carbon-carbon double bond; epoxyphosphorous acid obtained by ep-oxidizing a phosphorous acid ester having an olefinic unsaturation with peracetic acid; and an epoxy resin containing a heavy metal other than silicon and phosphorous in the form of a chelate.

7. A surface coating composition consisting essentially of (a) 100 parts by weight of at least one resinous substance selected from the group consisting of coal tar and asphalt, (b) 10 – 200 parts by weight of an epoxy resin having at least two vicinal epoxy groups in its molecule, (c) 0.01 – 60 parts by weight of at least one salt compound selected from the group consisting of a tetrasubstituted boron salt of an onium ion represented by the formula:

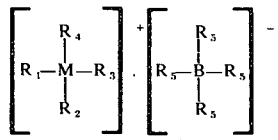

wherein M is N, P or As, $R_1$, $R_2$, $R_3$ and $R_4$ each are hydrogen, an alkyl, an alkenyl or an aryl and may be the same or different, and $R_5$ is phenyl or a substituted phenyl, and from the group consisting of tetrasubstituted boron salts of imidazolium ions obtained by reacting an acid with an imidazole represented by the formula:

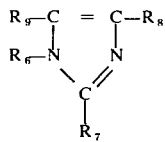

wherein $R_6$, $R_7$, $R_8$ and $R_9$ each are hydrogen, an alkyl, an alkenyl, an aryl or a cyanoalkyl and may be the same or different, or a derivative thereof to form an imidazolium salt and then reacting the resulting salt with a salt of an alkali metal and a tetrasubstituted boron having phenyl or a substituted phenyl as a substituent, (d) 5 – 150 parts by weight of at least one curing agent selected from the group consistingg of polycarboxylic anhydrides and amine compounds, and (e) 1 – 20 parts by weight per 100 parts by weight of the above-mentioned component (c) of at least one curing catalyst selected from the group consisting of boron trifluoride complex of diphenyl amine, aniline, o- or p-toluidine, 2,4-dimethylaniline, N-methylaniline, N-ethylaniline, N,N-diethylaniline, n-butylamine, ethylamine, N,N-dimethylaniline or piperidine, imidazole, 2-ethyl-4-methylimidazole, 2-methylimidazole, 2-phenylimidazole or 2-undecylimidazole; dimethylaminopropylamine, diethylaminopropylamine, triethylamine, diethylamine, benzyldimethylamine, 2-(dimethylaminomethyl) phenol, 2,4,6-tris(dimethylaminomethyl) phenol, diisopropylamine, triethanolamine, diethanolamine, methylethanolamine, piperidine, pyridine, aniline, monoethanolamine, nonylamine, N-aminopropylmorpholine or monoisopropanolamine, phenol, bisphenol A, resorcinol or nonylphenol; and zinc octanoate or tin octanoate.

8. A surface coating composition according to claim 7, wherein the epoxy resin is at least one epoxy resin selected from the group consisting of a bisphenol epoxy resin obtained from bisphenol A and epichlorohydrin; a novolac epoxy resin obtained by reacting a novolac resin with epichlorohydrin; a polyphenol epoxy resin obtained by reacting epichlorohydrin with a condensation product of a phenol with a xylene resin or toluene resin obtained by reacting xylene with formalin or reacting toluene with paraformaldehyde; a polyhydroxybenzene epoxy resin obtained by reacting epichlorohydrin with a phenol resin produced from a polyhydric phenol; an epoxy resin obtained by reacting an aromatic or aliphatic carboxylic acid with epichlorohydrin; an epoxy resin obtained from a vinyl polymer; an epoxy resin obtained from a polyhydric alcohol; an epoxy resin obtained from an alicyclic compound; an epoxy resin obtained from starch or an unsaturated higher fatty acid; a nitrogen-containing epoxy resin obtained from aniline or an aliphatic amine; an epoxy resin having a nitrogen-containing hetero-cyclic ring obtained from isocyanuric acid; a silicon-containing epoxy resin obtained by reacting an epoxy resin with silanol; a silicon-containing epoxy resin obtained by oxidizing a silicon compound having a carbon-carbon double bond; epoxyphosphorous acid obtained by ep-oxidizing a phosphorous acid ester having an olefinic unsaturation with peracetic acid; and an epoxy resin containing a heavy metal other than silicon and phosphorous in the form of a chelate.

9. A surface coating composition consisting essentially of (a) 100 parts by weight of at least one resinous substance selected from the group consisting of coal tar and asphalt, (b) 10 – 200 parts by weight of an epoxy resin having at least two vicinal epoxy groups in its molecule and (c) 0.01 – 60 parts by weight of at least one salt compound selected from the group consisting of tetrasubstituted boron salts of imidazolium ions obtained by reacting an acid with an imidazole represented by the formula:

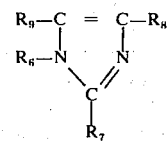

wherein $R_6$, $R_7$, $R_8$ and $R_9$ each are hydrogen, an alkyl, and alkenyl, an aryl or a cyanoalkyl and may be the same or different, or a derivative thereof to form an imidazolium salt and then reacting the resulting salt with a salt of an alkali metal and a tetrasubstituted boron having phenyl or a substituted phenyl as a substituent.

10. A surface coating composition according to claim 9, wherein the salt compound (c) is at least one of imidazolium.tetraphenylborate, methylimidazolium.-tetraphenylborate, 2-ethyl-4-methylimidazolium.tetraphenylborate, 2-ethyl-1,4-dimethyl-imidazolium.tetraphenylborate, 1-cyanoethyl-2-ethyl-4-methylimidazolium.tetraphenylborate, 1-cyanoethyl-2-undecylimidazolium.tetraphenylborate, 1-cyanoethyl- 2-phenylimidazolium.tetraphenylborate, 1-vinyl-2-methylimidazolium.tetraphenylborate, 1-vinyl-2,4-dimethylimidazolium.tetraphenylborate, 1-β-hydroxyethyl-2-methylimidazolium.tetraphenylborate, 1-allyl-2-methylimidazolium.tetraphenylborate, 1-allyl-2-phenylimidazolium.tetraphenylborate and 1-allyl-2-undecylimidazolium.tetraphenylborate.

11. A surface coating composition consisting essentially of (a) 100 parts by weight of at least one resinous substance selected from the group consisting of coal tar and asphalt, (b) 10 – 200 parts by weight of an epoxy resin having at least two vicinal epoxy groups in its molecule, (c) 0.01 – 60 parts by weight of at least one salt compound selected from the group consisting of tetrasubstituted boron salts of imidazolium ions obtained by reacting an acid with an imidazole represented by the formula:

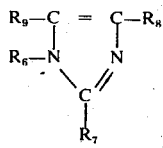

wherein $R_6$, $R_7$, $R_8$ and $R_9$ each are hydrogen, an alkyl, an alkenyl, an aryl or a cyanoalkyl and may be the same or different, or a derivative thereof to form an imidazolium salt and then reacting the resulting salt with a salt of an alkali metal and a tetrasubstituted boron having phenyl or a substituted phenyl as a substituent, and (d) 5 – 150 parts by weight of at least one curing agent selected from the group consisting of polycarboxylic anhydrides and amine compounds.

12. A surface coating composition consisting essentially of (a) 100 parts by weight of at least one resinous substance selected from the group consisting of coal tar and asphalt, (b) 10–200 parts by weight of an epoxy resin having at least two vicinal epoxy groups in its molecule, (c) 0.01 – 60 parts by weight of at least one salt compound selected from the group consisting of tetrasubstituted boron salts of imidazolium ions obtained by reacting an acid with an imidazole represented by the formula:

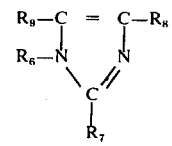

wherein $R_6$, $R_7$, $R_8$ and $R_9$ each are hydrogen, an alkyl, an alkenyl, an aryl or a cyanoalkyl and may be the same or different, or a derivative thereof to form an imidazolium salt and then reacting the resulting salt with a salt of an alkali and a tetrasubstituted boron having phenyl or a substituted phenyl as a substituent, (d) 5 – 150 parts by weight of at least one curing agent selected from the group consisting of polycarboxylic anhydrides and amine compounds, and (e) 1 – 20 parts by weight per 100 parts by weight of the above-mentioned component (c) of at least one curing catalyst selected from the group consisting of boron trifluoride complex of diphenylamine, aniline, o- or p-toluidine, 2,4-dimethylaniline, N-methylaniline, N-ethylaniline, N,N-diethylaniline, n-butylamine, ethylamine, N,N-dimethylaniline or piperidine, imidazole, 2-ethyl-4-methylamidazole, 2-methylimidazole, 2-phenylimidazole or 2-undecylimidazole; dimethylaminopropylamine, diethylaminopropylamine, triethylamine, diethylamine, benzyldimethylamine, 2-(dimethylaminomethyl)phenol, 2,4,6-tris(dimethylaminomethyl)phenol, diisopropylamine, triethanolamine, diethanolamine, methylethanolamine, piperidine, pyridine, aniline, monoethanolamine, nonylamine, N-aminopropylmorpholine or monoisopropanolamine; phenol, bisphenol A, resorcinol or nonylphenol; and zinc octanoate or tin octanoate.

* * * * *